(12) United States Patent
Jeong et al.

(10) Patent No.: US 8,820,576 B2
(45) Date of Patent: Sep. 2, 2014

(54) COSMETICS CONTAINER

(75) Inventors: Hae Won Jeong, Anyang-si (KR); Chang Gyu Yoo, Yongin-si (KR); Jin Kyoung Kim, Seoul (KR); Ye jong Chang, Seoul (KR); Yee Hwa Kim, Seongnam-si (KR); Rita Chai, Seoul (KR)

(73) Assignee: Amorepacific Corporation, Seoul (KR)

( * ) Notice: Subject to any disclaimer, the term of this patent is extended or adjusted under 35 U.S.C. 154(b) by 0 days.

(21) Appl. No.: 13/514,940

(22) PCT Filed: Dec. 10, 2010

(86) PCT No.: PCT/KR2010/008873
§ 371 (c)(1), (2), (4) Date: Jun. 8, 2012

(87) PCT Pub. No.: WO2011/071349
PCT Pub. Date: Jun. 16, 2011

(65) Prior Publication Data
US 2012/0267390 A1    Oct. 25, 2012

(30) Foreign Application Priority Data
Dec. 11, 2009   (KR) .................... 20-2009-0016173 U

(51) Int. Cl.
*B67D 7/22*    (2010.01)
*B05B 11/00*   (2006.01)
*G01F 22/00*   (2006.01)
*B65D 83/00*   (2006.01)

(52) U.S. Cl.
CPC ............. *B05B 11/0048* (2013.01); *B05B 11/30* (2013.01); *G01F 22/00* (2013.01); *B65D 83/0033* (2013.01)
USPC ................. 222/41; 222/45; 222/47; 222/386; 116/227; 116/285; 73/321

(58) Field of Classification Search
USPC ........... 222/41, 44, 45, 47, 386, 256; 73/1.73, 73/309, 290 R, 305; 116/228, 284, 303, 116/200, 285, 227, 208, 201
See application file for complete search history.

(56) References Cited

U.S. PATENT DOCUMENTS 219,702 A  *  9/1879  Eckhoff ........................ 73/321
943,596 A  *  12/1909 Hans ............................. 73/321
(Continued)

FOREIGN PATENT DOCUMENTS

JP   2005-305370 A   11/2005
JP   2006-256652 A    9/2006
(Continued)

OTHER PUBLICATIONS

International Search Report of PCT/KR2010/008873.

*Primary Examiner* — Kevin P Shaver
*Assistant Examiner* — Michael J Melaragno
(74) *Attorney, Agent, or Firm* — Justin H. Kim; Maxon IP LLC

(57) ABSTRACT

A cosmetic container includes a piston in which content contained in the container always reaches a content inlet of an airless discharge pump as the piston rises upward along and on an inner wall of the container with operation of the airless discharge pump. More specifically, the content amount remaining in the container is indicated in association with the rising movement of the piston. The cosmetic container includes a container body, an airless discharge pump installed to the container body, a piston installed in the container body so that a topmost level of content contained in the container body reaches a content inlet of the airless discharge pump as the piston moves upward along and on an inner wall of the container body with operation of the airless discharge pump, and an indicator indicating content amount remaining in the container body in association with rising movement of the piston.

3 Claims, 4 Drawing Sheets

(56) References Cited

U.S. PATENT DOCUMENTS

| | | | | |
|---|---|---|---|---|
| 1,177,423 | A | * | 3/1916 | La Rue ............................ 222/45 |
| 3,078,011 | A | * | 2/1963 | Safianoff ......................... 222/41 |
| 3,202,319 | A | * | 8/1965 | Howard ........................... 222/41 |
| 3,482,447 | A | * | 12/1969 | Bennett ............................ 73/321 |
| 4,244,219 | A | * | 1/1981 | Takahashi ........................ 73/309 |
| 4,474,313 | A | * | 10/1984 | Sieverding .................... 222/211 |
| 4,629,097 | A | * | 12/1986 | Moore ...................... 222/153.13 |
| 4,671,432 | A | * | 6/1987 | Benecke et al. ............... 222/386 |
| 4,684,043 | A | * | 8/1987 | Foster et al. .................. 222/386 |
| 4,684,044 | A | * | 8/1987 | Foster ............................ 222/386 |
| 4,685,594 | A | * | 8/1987 | Czech ............................ 222/182 |
| 5,144,836 | A | * | 9/1992 | Webb ............................... 73/319 |
| 5,649,450 | A | * | 7/1997 | Glab et al. ...................... 73/307 |
| 6,705,163 | B1 | * | 3/2004 | Lattner et al. ................... 73/309 |
| 2006/0191812 | A1 | * | 8/2006 | Oudekerk et al. .......... 206/459.1 |

FOREIGN PATENT DOCUMENTS

| | | | | |
|---|---|---|---|---|
| KR | 20-0415350 | * | 5/2006 | ............. B65D 25/56 |
| KR | 20-0415350 | Y1 | 5/2006 | |
| KR | 20-2009-0010380 | U | 10/2009 | |

* cited by examiner

COSMETICS CONTAINER

TECHNICAL FIELD

The invention relates to a cosmetic container including a piston in which content contained in the container always reaches a content inlet of an airless discharge pump as the piston rises upward along and on an inner wall of the container with operation of the airless discharge pump. More specifically, the invention relates to such a cosmetic container in which content amount remaining in the container is indicated in association with the rising movement of the piston.

RELATED ART

Generally, an airless discharge pump has been employed for discharging, with appropriate amount, liquid or gel state contents contained in a container.

Such an airless discharge pump may discharge the contents with small and accurate amount and hence has been employed in a functional cosmetic container whose functional content may be typically expensive.

The cosmetic container further includes a piston by which the content contained in the container may always reach a content inlet of the airless discharge pump.

That is, as the piston mounted in the container rises upward along and on an inner wall of the container, a topmost level of the content contained in the container approach the content inlet of the airless discharge pump.

However, generally, a product name, a manufacturer and so on of the cosmetic is indicated on an outer face of the cosmetic container or the cosmetic container itself is made of opaque material so that the content contained in the container may not be affected by direct rays of sun. Therefore, it is difficult for a user to check out the amount of the content remaining in the container.

SUMMARY OF THE INVENTION

Problem to be Solved

Accordingly, the invention is conceptualized with the consideration of the above situation and thus an object thereof is to provide a cosmetic container in which content amount remaining in the container or content exhaustion level is indicated in association with rising movement of the piston.

Solution for the Problem

A cosmetic container according to the invention includes a container body; an airless discharge pump installed to the container body; a piston installed in the container body so that a topmost level of content contained in the container body reaches a content inlet of the airless discharge pump as the piston moves upward along and on an inner wall of the container body with operation of the airless discharge pump; and an indicator indicating content amount remaining in the container body in association with rising movement of the piston.

Effect of the Invention

In accordance with the invention, it is easy for a user to easily check out the content amount remaining in the container.

BRIEF DESCRIPTION OF THE ACCOMPANYING DRAWINGS

Embodiments of the present invention are illustrated by way of example, and not by way of limitation, in the drawings and in which like reference numerals refer to similar elements.

Figure 3:
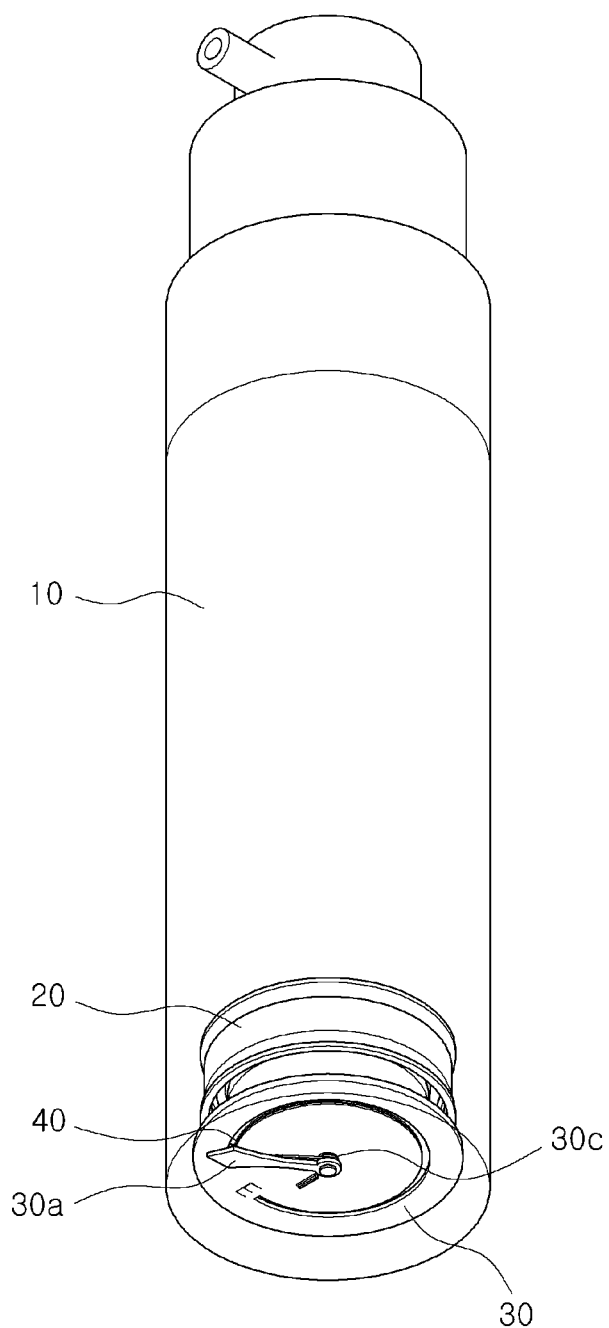
Figure 4:
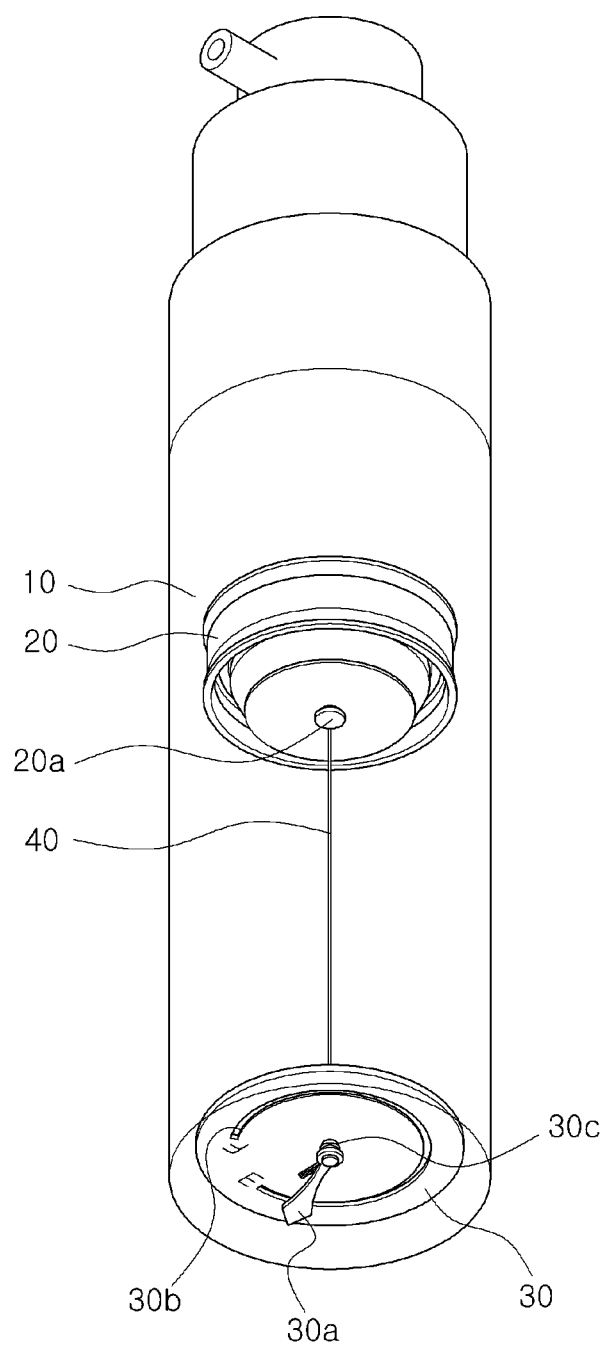

FIG. 3 is a view of an initial state at which the container is completely filled with the content and thus a piston is positioned as close to a bottom of the container as possible; and FIG. 4 is a view of a content exhaustion state at which the content in the container becomes substantially exhausted and thus the piston is positioned as close to a content inlet of an airless discharge pump as possible.

DETAILED DESCRIPTION

Below, a preferred exemplary embodiment of the invention will be described in details with reference to the accompanying drawings. It should be understood that the invention is not limited to the exemplary embodiment but rather many variations may be possible to the skilled person to the art.

Figure 1:
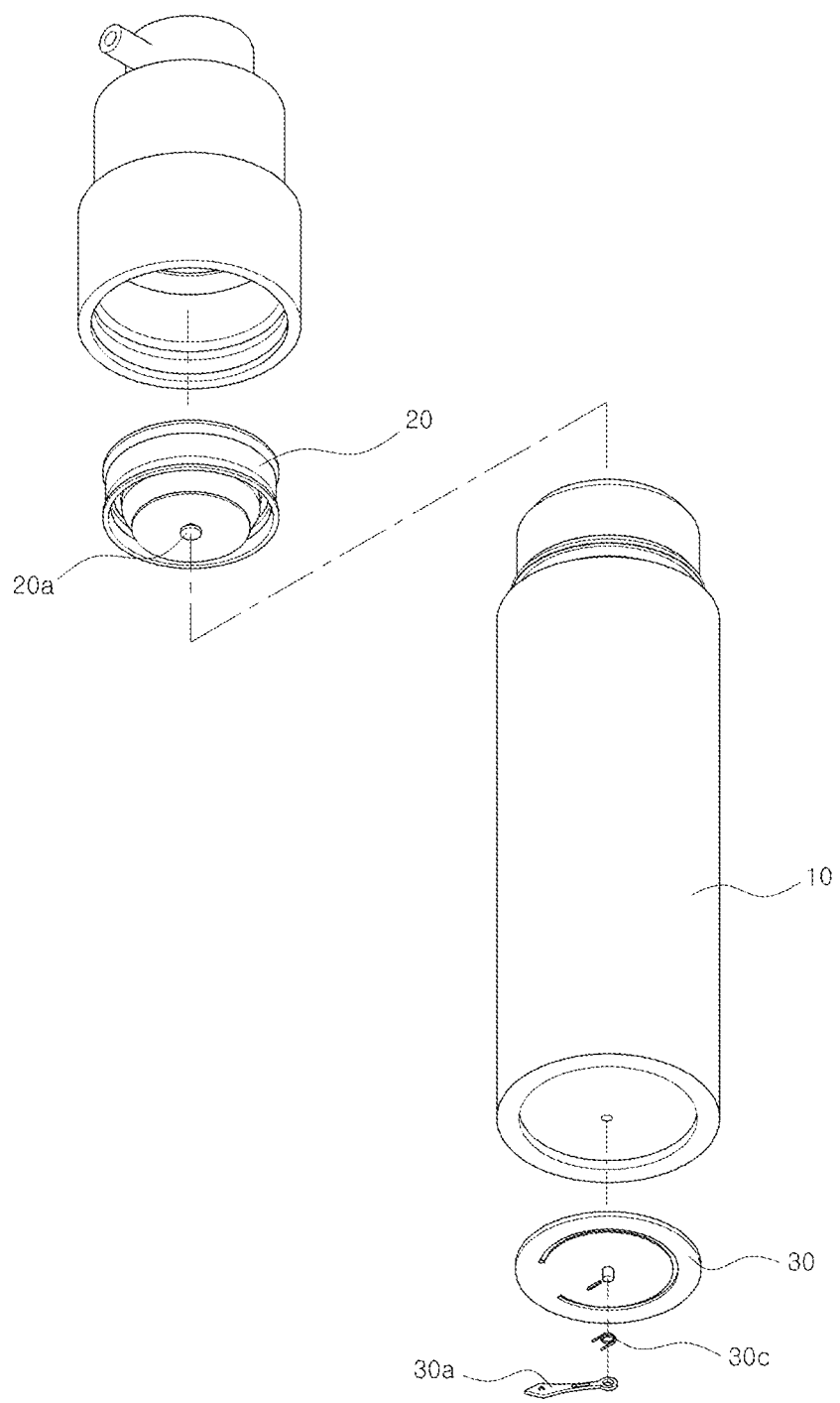
FIG. 1 is a disassembled configuration view of a cosmetic container according to the invention.

FIG. 1 is a disassembled configuration view of a cosmetic container according to the invention.

Referring to FIG. 1, the cosmetic container in accordance with the invention includes a container body 10, a piston 20 mounted into the body 10 and an indicator 30 indicating exhaustion level of the content contained in the container body in association with rising operation of the piston 20.

An airless discharge pump (not shown) including a press button and an content injecting hole is mounted onto a top of the container body 10. The airless discharge pump may be installed in a conventional or usual manner as apparent to the skilled person in the art and therefore details thereof are omitted herein.

The piston 20 rises upward along and on an inner wall of the container body 10 as the content in the container body 10 becomes gradually exhausted. The rising operation of the piston 20 may depend on vacuum pressure within the container body 10. The rising operation of the piston 20 may be activated using a pinion gear installed between the piston 20 and the press button for operating the airless discharge pump. Korean Utility Model Application Publication No. 2008-0002044 (publication date: Jun. 23, 2008) discloses a cosmetic container using such a pinion gear for lifting up the piston.

The indicator 30 is installed beneath a bottom face of the container body 10, and includes an indicating pointer or needle 30a so as to inform the user of the content amount currently remaining in the container body 10. The indicating pointer 30a may rotate in association with the rising movement of the piston 20.

Figure 2:
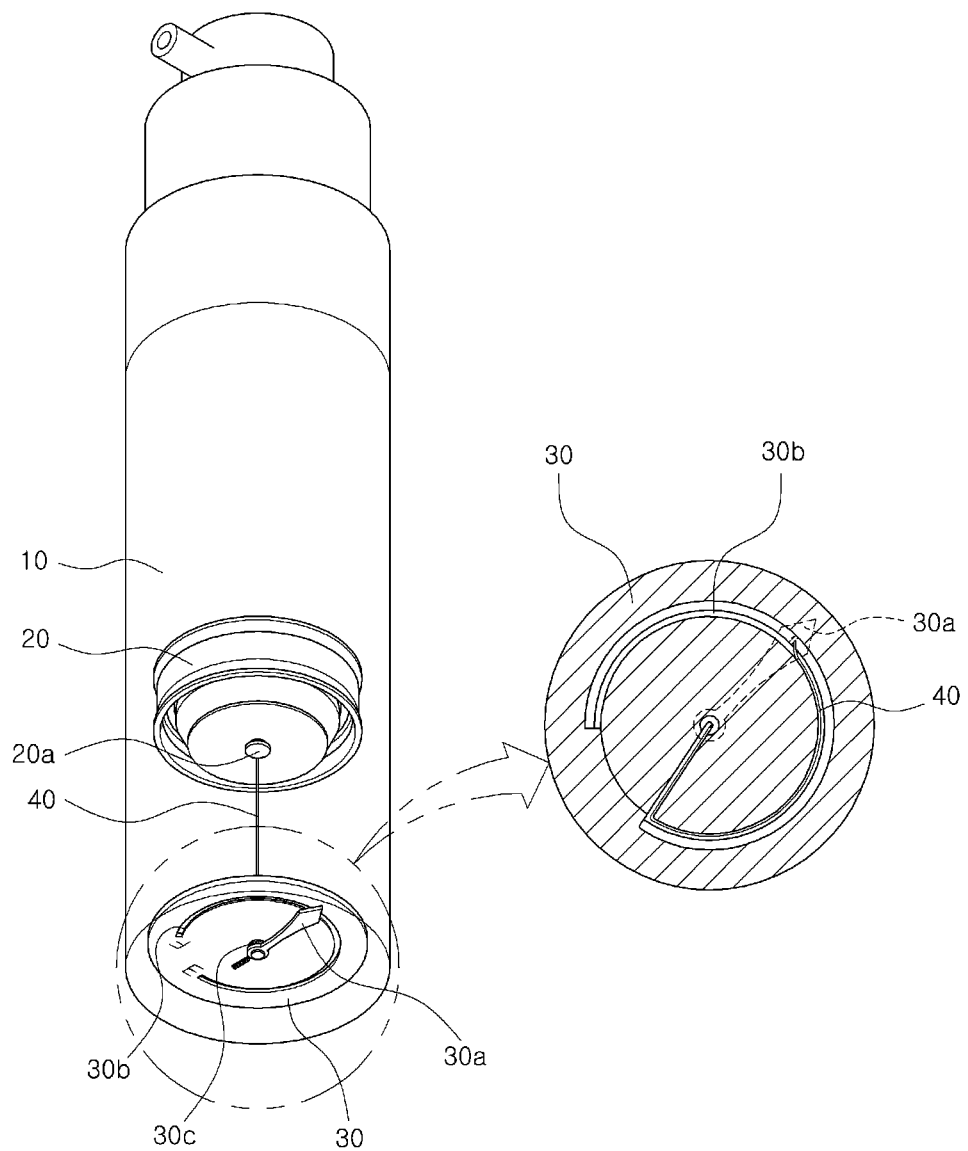
FIG. 2 illustrates a connection relationship between an indicator and a piston, and a structure of the indicator as shown in FIG. 1.

FIG. 2 illustrates a connection relationship between the indicator 30 and a piston 20, and a structure of the indicator 30 as shown in FIG. 1.

Referring to FIG. 2, the indicator 30 may include the indicating pointer or needle 30a for informing the user of the remaining content amount, a winding groove 30b and a torsion spring 30c. Meanwhile, a thread fixing portion 20a is installed at the bottom face of the piston 20.

The indicating pointer 30a is suppressed with the torsion spring 30c in an elastic manner against movement. The indicating pointer 30a and the thread fixing portion 20a are connected with each other via a thread 40. The thread 40 coupled to the indicating pointer 30a is wound in and along the winding groove 30b and passes through a hole at the other end of the winding groove 30b and reaches the thread fixing portion 20a installed at the bottom face of the piston 20. As shown in FIG. 2, the winding groove 30b may be formed in a plate of the indicator 30 in a duct manner so as to be hollow.

As the piston 20 moves up, the thread 40 is drawn upward and in turn the indicating pointer 30a coupled to the thread 40 is pulled around to rotate.

FIG. 3 is a view of an initial state at which the container body 10 is completely filled with the content and thus the piston 20 is positioned as close to a bottom of the container body 10 as possible.

Referring to FIG. 3, the piston 20 is in its lowest position and hence the thread 40 is not drawn upward by the piston 20. At this state, the indicating pointer 30a is suppressed with the torsion spring 30c in the elastic manner against the rotation movement and thus indicates the filling state of the container body 10.

FIG. 4 is a view of a content exhaustion state at which the content in the container body 10 becomes substantially exhausted and thus the piston 20 is positioned as close to a content inlet (not shown) of the airless discharge pump as possible.

Referring to FIG. 4, the piston 20 is in its highest position and hence the thread 40 is drawn upward by the piston 20 with full force. At this state, the indicating pointer 30a is also drawn around with full force by the thread 40 connected thereto so as to rotate, thereby indicating the exhaustion state of the container body 10.

At an intermediate state between the filling and exhaustion states, the rotation amount of the indicating pointer 30a is proportional to the rising height of the piston 20, that is, used amount of the content. Consequently, it is easy for the user to easily check out the content amount remaining in the container body 10 by looking into the positions of the indicating pointer 30a.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A cosmetic container, comprising:
a container body having a bottom face wherein a hole is disposed at the center of the bottom face;
an airless discharge pump installed inside the container body;
a piston having a thread fixing portion installed at a bottom face of the piston, the piston installed inside the container body so that a topmost level of content contained in the container body reaches a content inlet of the airless discharge pump as the piston moves upward along and on an inner wall of the container body with operation of the airless discharge pump;
an indicator plate comprising an indicating pointer, a winding groove, and a torsion spring, the indicator plate directly attached on the bottom face of the container, the indicating pointer disposed at the center and outside of the indicator plate for rotation, the winding groove formed so on the inside of the indicator plate that the indicating pointer rotates in correspondence with the winding groove, the torsion spring suppressing the indicating pointer in an elastic manner from movement; and
a thread connecting between the thread fixing portion and the indicating pointer wherein the thread is coupled to the indicating pointer, is wound in and along the winding groove, passes through the hole disposed at the bottom face, and directly connects the thread fixing portion, so that the indicating pointer rotates as the thread is drawn up with the rising movement of the piston.

2. The container of claim 1, wherein the bottom face is in a recessed form, so that the indicator plate is fitted within the recessed form.

3. The container of claim 1, wherein the winding groove is formed in a duct manner so as to be hollow.

* * * * *